Figure 1:
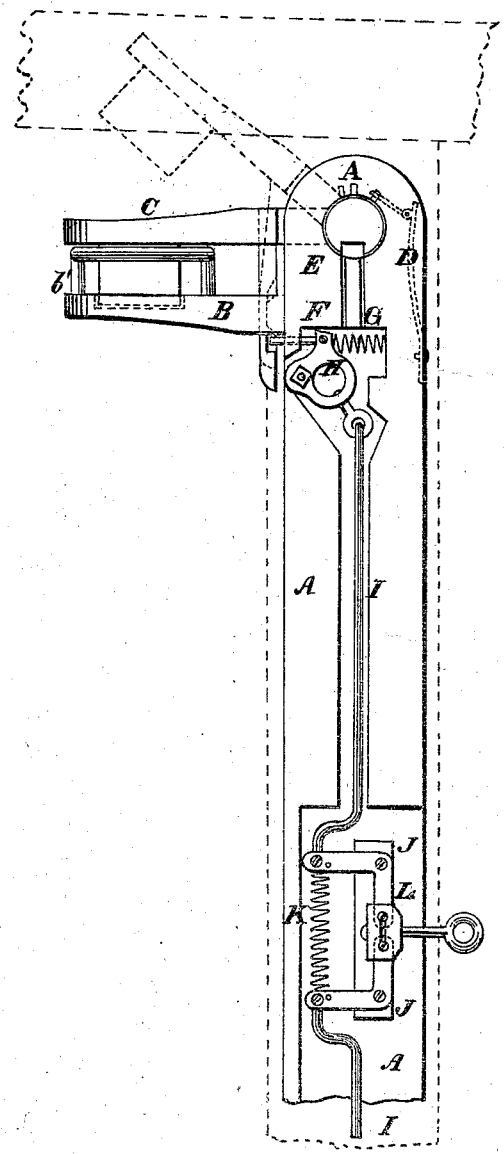

R. R. JONES.
Devices for Detaching Horses.

No. 143,286. Patented September 30, 1873.

Witnesses.

Inventor.

UNITED STATES PATENT OFFICE.

ROLLA R. JONES, OF PILLAR POINT, NEW YORK.

IMPROVEMENT IN DEVICES FOR DETACHING HORSES.

Specification forming part of Letters Patent No. 143,286, dated September 30, 1873; application filed May 24, 1873.

*To all whom it may concern:*

Be it known that I, ROLLA R. JONES, of Pillar Point, in the county of Jefferson and State of New York, have invented a new and useful Improvement in Safety Device for Attaching a Horse to Shafts, of which the following is a specification:

Figure 1 is a top view of the part of the device for connecting the tug with the whiffletree.

Similar letters of reference indicate corresponding parts.

The invention consists in an improvement of shaft-connections by which horses are attached to vehicles, as hereinafter described and pointed out in the claims.

A represents the whiffletree, upon the forward side of which, near each end, is attached a short arm, B, in the outer side of which is formed a recess to receive a projection formed upon the inner side of a similar arm, C, which is pivoted to the end of the whiffletree A. With the pivoted arm C is connected a spring, D, so as to draw back the arm C whenever it may be released. To the outer side of the arm B is attached a loop or box, $b'$, to receive the tug and prevent it from sticking upon the projection of the arm C, and being carried with said arm when it is drawn back. To the pivoted arm C is pivoted a rod, E, which passes through the arm B at its base, and has a notch formed in it to receive a catch, F, which is held forward by a coiled spring, G, placed in a recess in the whiffletree A. The catch F is pivoted to a plate or bent lever, H, which is pivoted to the whiffletree A, and to which is also pivoted the end of a rod, I, which passes along a groove in the whiffletree A, and the other end of which is pivoted to an arm of the bent lever J, pivoted at its angle to the whiffletree A, or to a plate attached to said whiffletree. The other end of the whiffletree is provided with a similar device. The two arms of the levers J, to which the rods I are pivoted, are held apart by a coiled spring, K, interposed between and connected with them. To the other arm of the two levers J is connected an eye, L, by means of which the levers J are operated to withdraw the catches F, and allow the arms C to spring back, releasing the tug.

The eye L may be operated by hand, or by a wire extending to the carriage and secured in such a position that it may be readily reached by a person in said carriage to detach the horse when desired. In this case, the said wire should be incased in a tube to protect it and prevent the horse from detaching himself by switching his tail.

By this construction, when the tugs are detached from the whiffletree and the horse moves forward, the eye R will be turned forward, and will pass out, leaving the horse free.

Having thus described my invention, I claim as new and desire to secure by Letters Patent—

1. The rigid arm B, spring-arm D C, and loop $b'$, combined with whiffletree A, to allow the horse to be released from the shafts by the turning of arm C, in the manner set forth.

2. The combination, with pivoted arms C C, of notched rods E E, pivoted spring-pressed catch F, pivoted plates H H, rods I I, levers J J, and eye-piece L, to enable the pieces C C to be turned, in the manner and for the purpose described.

ROLLA REES JONES.

Witnesses:
WAKEMAN J. DIBBLE,
LYMAN ACKERMAN.